Oct. 6, 1959   F. M. YOUNG ET AL   2,907,878
ELECTRONIC INTERPOLATOR
Filed Dec. 12, 1955

INVENTORS
F. MANSFIELD YOUNG
THOMAS K. NAYLOR
BY Kenway Jenney Witter
 + Hildreth
ATTORNEYS

United States Patent Office 2,907,878
Patented Oct. 6, 1959

2,907,878
ELECTRONIC INTERPOLATOR

Frink Mansfield Young, Boston, and Thomas K. Naylor, Belmont, Mass., assignors to Research Corporation, New York, N.Y., a corporation of New York Application December 12, 1955, Serial No. 552,640

10 Claims. (Cl. 250—27)

This invention relates to electronic sampled-data filters, electronic interpolators, and the like.

In various types of computing apparatus, it is not uncommon for sampled data to appear as more or less discrete voltage pulses spaced at equal time intervals. Sampled data may also be in the form of voltage steps where each step is of the same duration. In both situations the need often arises to estimate the value of the intelligence signal between data pulses or data steps. For example, smoothing out the sampled data may be necessary before feeding the signal to a recording device whose response characteristic does not permit recording sudden changes of voltage. In other cases, where the signal is to be an input to an analog computer, it may be desirable to transform the pulses, or stepped data pulses, into smooth signals. In servo-mechanisms, control signals which are stepped voltages often subject the control servo motor to severe operational demands and it is generally preferable to utilize a smooth continuous command signal accurate at each datum point. While present types of low-pass fixed component data filters are capable of generating continuous smooth output signals, the output signals from such filters are not an interpolation between datum steps but merely an approximation.

It is therefore an object of the present invention to provide apparatus for converting a stepped or pulsed input signal into a smoothed signal that corresponds accurately to the stepped signal at the leading edge of each step.

More specifically, it is an object of the invention to provide an electronic filter or interpolator wherein a stepped input signal is converted into a smooth output which passes through each datum step of the stepped input voltage, and wherein the output between datum points corresponds to a mathematically acceptable estimate or interpolation.

By way of example, if four points on a curve are known, a mathematically acceptable output is defined by a cubic polynomial passing through the four points. Accordingly, a feature of the present invention is the provision of an electronic interpolator that performs the interpolation in the form of a cubic polynomial, using the middle portion of a cubic passing through four successive datum points as its output between the two middle datum points, thereby affording a truer interpolation than has been afforded by filters heretofore available.

Another feature of the interpolator of the present invention is the linear phase characteristic or constant delay between input and output. The delay characteristics of present filter systems are not constant throughout their operational bandwidth. The interpolator to be described has a constant delay time of a certain number of sampling periods or input voltage steps. For example, for the cubic interpolator the output is delayed by two sampling periods.

Prior electronic interpolators, as opposed to filter systems, have been confined to linear or first order interpolation which amounts, in effect, to drawing a straight line between two successive datum points. This results in large discontinuities of slope at the datum points. According to my invention, it is possible to generate an output corresponding to a polynomial of whatever order desired which passes though a group of points. For example, a second order interpolator would use the first or second segment of a parabola passing through three successive datum points. The cubic interpolator to be described uses the middle portion of a cubic passing through four successive points. In this manner discontinuities in slope at the datum points are reduced with the result that a more accurate interpolation is produced.

The invention likewise comprehends as a feature a novel and effective sampling circuit, by which an input signal may be converted into a stepped voltage wherein each step is of equal duration and accurately represents the voltage level of the input signal at the beginning of said step.

Other objects and features will appear from the following description of a preferred embodiment of interpolator taken in conjunction with the accompanying drawings wherein Fig. 1 is a plot of a stepped input signal and to be referred to in describing the mode of interpolation carried out by the apparatus of the invention.

Figure 1:
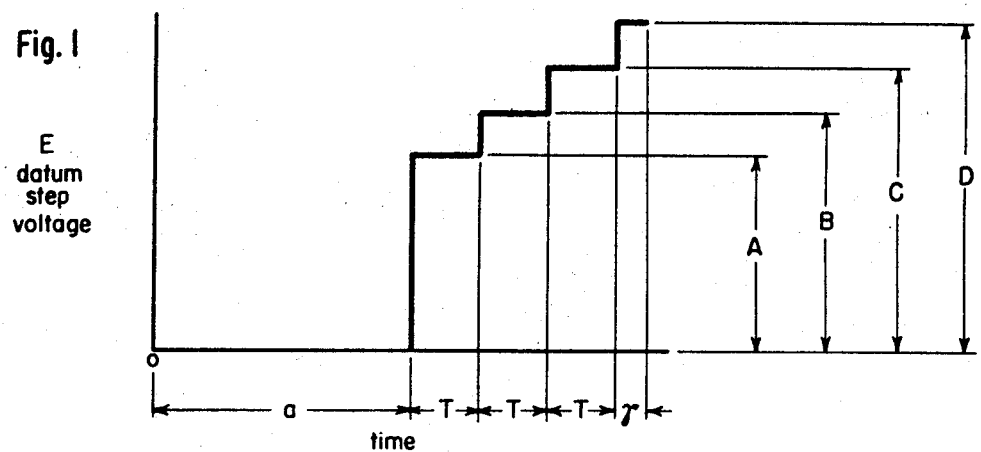

Before proceeding to a detailed description of the apparatus, it may be helpful to consider the mathematical basis for the interpolator procedure, utilizing Fig. 1 for reference. The interpolation is given by Newton's interpolation formula $$f(x) = f(a) + \sum_{n=1}^{n}\left[\frac{(x-a)(x-a-T)\ldots(x-a-nT+T)}{n!T^n}\Delta^n f(a)\right] + R$$

$\Delta^n f(a)$ is equal to the $n$th order difference between samples appearing at equal intervals T apart. R is equal to the remainder or error. This formula yields the desired function expressed as differences of progressive orders between a number of consecutive datum points. Using Newton's interpolation equation evaluated for third order differences, we arrive at an expression which is the basis of the cubic interpolator. This particular embodiment is illustrated since in most data handling operations the cubic interpolator provides the optimum configuration. When four datum steps are available each T interval apart, an expression of the function between the middle points, $f(a+T+\tau)$, is obtained from Newton's interpolation formula.

$$f(a+T+\tau) = f(a) + \Delta f(a)\frac{\tau}{T}\left(\Delta f(a) + \frac{\Delta^1 f(a)}{2} - \frac{\Delta^3 f(a)}{6}\right)$$
$$+ \frac{\tau^2}{2!T^2}[\Delta^2 f(a)] + \frac{\tau^3}{3!T^3}[\Delta^3 f(a)]$$

It is apparent from the form of the above expression that it is closely analogous to a Taylor's Series using differences instead of derivatives. The first, second and third order differences approach the first, second and third order differentials where T, the time between samples, approaches zero.

The terms of the third-order difference equation set out above may be illustrated graphically using Fig. 1 in which four datum steps are illustrated at an arbitrary time $a$ from the origin. Adjacent steps are separated by equal intervals of time T. The function at time $$(a+T+\tau)$$

is what the interpolator develops as an output. Assuming the four pulses in Fig. 1 are the latest received, the present time is $(a+3T+\tau)$. The output is therefore delayed by a time interval of 2T and represents the middle portion of a cubic polynomial passing through the four points. In Fig. 1 the magnitudes of the four steps illustrated are labeled A, B, C and D. In terms of these magnitudes, some of the terms in the difference equation may be illustrated.

$$f(a)=A$$
$$\Delta f(a)=B-A$$
$$\Delta^2 f(a)=[C-B]-[B-A] \text{ or } C-2B+A$$
$$\Delta^3 f(a)=([D-C]-[C-B])-([C-B]-[B-A])$$
$$=-A+3B-3C+D$$

It is apparent that by retaining the value of these datum pulses and determining the sums and difference thereof, the first, second, and third order differences may be generated.

Again returning to the 3rd order difference equation, the only variable present is $\tau$. Considering only four consecutive points at one time, the first, second and third order differences are constant. T, the period between steps, is also a constant characteristic of the input. Since the desired output varies with the time elapsed between samples, $\tau$, integrators are used to generate the third, fourth and fifth terms in the difference equation. Elements of the interpolator which perform the memory function are called samplers. They consist of high speed impulse modulators which trip simultaneously with the datum step every T seconds and a capacitive-filter arrangement which holds the voltage sampled until tripped again when a new voltage sample is received.

The input steps every T seconds by hypothesis. The samplers also trip at the same instant and receive a new voltage to hold, hence the cubic interpolator uses only four datum points at any one time. At any particular time the four points, used in relation to the output, are the two previous and the two subsequent to the output on the time scale. Or, as mentioned above, the output is delayed by a period of 2T.

Figure 2:
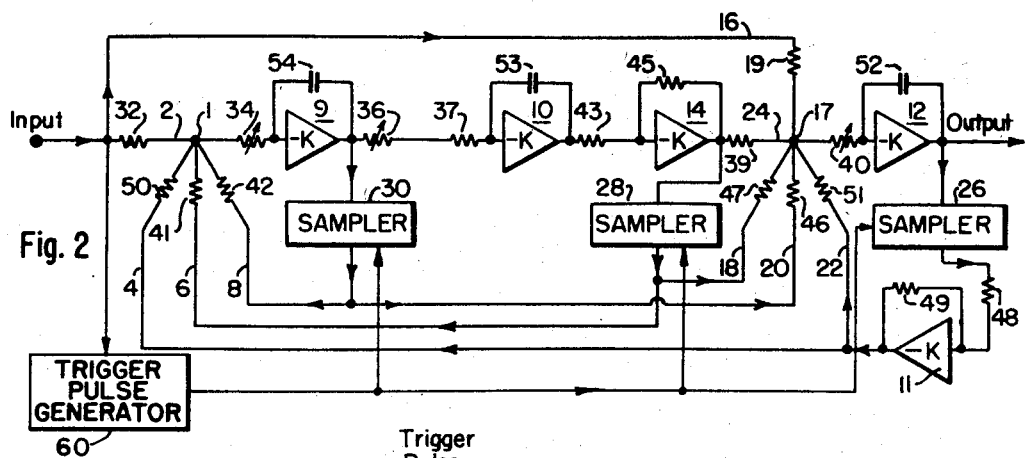
Fig. 2 is a schematic diagram of a cubic interpolator according to the invention.

The cubic interpolator illustrated in Fig. 2 comprises a plurality of integrators, inverters, and samplers. The integrators are shown at 9, 10 and 12, the inverters at 11 and 14, and the samplers at 28, 30 and 36. The integrators are of the parallel capacitive feedback type, such as illustrated and described in Korn and Korn: Electronic Analog Computers (1952) at page 138, with the modification of J. M. Miller wherein the feedback is provided by capacitance alone, rather than by parallel resistance and capacitance. In the illustrated embodiment, the feedback capacitances are indicated at 54, 53 and 52 for the integrators 9, 10 and 12, respectively.

The phase inverters 11 and 14 are likewise of conventional configuration, embodying, as in the case of the integrators, amplifiers of high negative gain represented by the symbol $-K$. In the case of inverter 11, resistors 48 and 49 are equal, and for inverter 14, resistors 43 and 45 have equal values.

The samplers 26, 28 and 30, not being conventional components, are separately illustrated and described below. Trigger pulses for operating the samplers 26, 28 and 30 are generated by the trigger pulse generator 60 from the input signal. These trigger pulses correspond in time to the leading edge of the stepped data and are applied to the trigger pulse input lead of each sampler.

Referring to Fig. 2, the stepped input signal is applied to the first adding junction 1 through resistor 32 and lead 2 so as to combine with the voltages delivered by the converging leads 4, 6, 8. The input is simultaneously applied to a second adding junction 17 by lead 16, after passing through resistance 19. The signal from the first adding junction 1 passes through a variable resistance 34 and becomes the input to the first integrator 9. The first variable resistance 34 acts as a vernier adjustment for the time constant (RC) of the first integrator 9.

The output of the first integrator 9 is sampled by the first sampler 30 simultaneously with the appearance of the most recent input pulse. The voltage held by the first sampler 30 is applied through a lead 8 and resistance 42 to the first adding junction 1 and simultaneously through lead 20 and resistance 46 to the second adding junction 17. The output of the first integrator 9 passes through a second variable resistance 36 which acts as a vernier adjustment for the time constant (RC) of the second integrator 10. From the second variable resistance 36 the output of the first integrator 9 passes through another resistance 37 and becomes the input to the second integrator 10. The output of the second integrator 10 is then inverted by the first inverter 14.

The output of the first inverter 14 is sampled by the second sampler 28. The voltage held by the second sampler 28 is simultaneously applied through a lead 6 and resistance 41 to the first adding junction 1 and through another lead 18 and resistance 47 to the second adding junction 17. The output from the first inverter 14 passes through a resistance 39 and is applied through a lead 24 to the second adding junction 17 where it is combined with the voltages delivered by the converging leads 16, 18, 20, 22. The signal at the second adding junction 17 passes through a third variable resistance 40 and becomes the input to the third integrator 12. The third variable resistance 40 acts as a vernier adjustment for the time constant (RC) of the third integrator 12.

The output of the third integrator 12 constitutes the output of the cubic interpolator. This output is sampled by the third sampler 26, inverted by a second inverter 11, and simultaneously applied through a lead 4 and resistance 50 to the first adding junction 1, also through lead 22 and resistance 51 to the second adding junction 17. The three condensers 52, 53, 54 shown in Fig. 4 as part of each of the three integrators 9, 10, 12 are of substantially equal capacitance. As has already been indicated, the three amplifiers shown in the three integrators 9, 10, 12 and the two amplifiers shown in the two inverters 14, 11 possess a high negative gain denominated $-K$. The arrows shown on the leads in Fig. 2 indicate the direction of signal flow. All samplers 30, 28, 26 trip simultaneously with each step in the input, the triggering pulse sources and connections being conventional and omitted for reasons of clarity.

Figure 3:
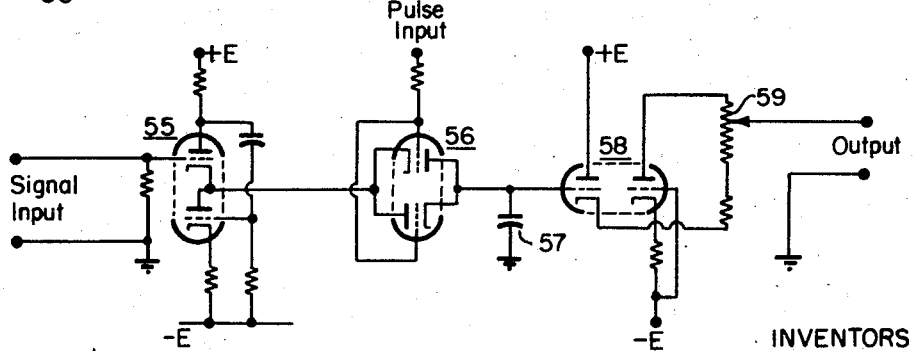
Fig. 3 is a diagram of the sampling circuits.

Fig. 3 illustrates a sampler suitable for use with the interpolator of Fig. 2. The signal to be sampled, which may be of any form, is applied to the isolation stage 55 of the sampler. The isolation stage 55 consists of a linear low output impedance double cathode follower. Its function is to isolate the input signal from the next stage or the switching tube 56 when the switching tube conducts so that very little load is placed upon the input signal when it is being sampled.

The output from the double cathode follower 55 is applied to the cathode of one triode and the plate of the other half of a twin triode 56 which forms a switching tube. The switching tube 56 grids are connected in parallel to trigger pulse source so that the tube is triggered only when the pulse forces both grids to be positive. When the grids are negative the switching tube 56 does not conduct. The source of trigger pulses is conventional and therefore not illustrated in detail. The duration of the trigger pulses is adjusted so that the switching tube 56 will conduct for a sufficient period to allow the storage condenser 57 in the output of tube 56 to become fully charged to a voltage equal to the signal voltage at the instant sampled. The charge on the storage condenser 57 is the sample of the input which will be held and applied at the output until the switching tube 56 fires and allows the storage condenser 57 to be charged to a new voltage step.

The twin triode output tube 58 isolates the external load from the storage condenser 57 to maintain the charge thereon, since the grid current drawn from the storage condenser 57 is extremely small. The sampler output is taken from a potentiometer 59 which removes the direct current component in the output inserted by the tube biases when the input is zero. The effective gain of the sampler in the interpolator circuit is made equal to unity.

The fundamental approach used in the construction of the cubic interpolator may be understood by examining the terms of the difference equation. The fifth term of the difference equation evaluated for third order differences $$\frac{\tau^3}{3!T^3}(\Delta^3 f(a))$$

may be considered, for each particular set of four datum steps as a constant, $\Delta^3 f(a)$, times $$\frac{\tau^3}{3!T^3}$$

When $-(\Delta^3 f(a))$ is fed into a series of three Miller integrators the output is $$\frac{\Delta^3 f(a)\tau^3}{(RC)^3 3!}$$

Since the time constant (RC) of the integrators in the interpolator is made equal to T, the period between data steps, the feeding of $(-\Delta^3 f(a))$ through three integrators in series generates the desired fifth term. Since each integrator inverts the output, a minus input results in a positive output. As shown in Fig. 2 the first inverter 14 is placed after the second integrator 10 thereby allowing a positive input to the first integrator 9 to result in a positive output from the last integrator 12. Likewise the fourth term in the difference equation may be thought of as a constant $(\Delta^2 f(a))$ times $$\frac{\tau^2}{2!T^2}$$

For this reason the generation of the fourth term is accomplished by feeding $\Delta^2 f(a)$ into two integrators in series. The third term which varies directly with $\tau$ is generated by feeding $$-\left(\Delta f(a) + \frac{\Delta^2 f(a)}{2} - \frac{\Delta^3 f(a)}{6}\right)$$

into a single integrator. Since only three integrators are used, the latter two perform concurrent integrations. The output, as mentioned above, is the whole of the difference equation.

From the above analysis it is apparent that the input to the first integrator 9 in Fig. 2 must be $\Delta^3 f(a)$ or, in terms of the datum step magnitudes shown in Fig. 1, $$-A+3B-3C+D$$

This input is a constant for each set of four datum steps. As shown in Fig. 2 this integrator input is prepared from various proportions of the output of the three samplers 30, 28, 26 and the present input.

The resistances identified in Fig. 2 are given values in the following schedule as various proportions of a unit of resistance R. This unit of resistance, R, when multiplied by the capacitance of the condensers used in the integrators, produces the time constant of each of the integrators. All integrators have equal time constants.

*Schedule of relative values*

| Resistor Designation | Relative Resistance |
|---|---|
| Resistors in leads converging at the first adding junction 1: | |
|   lead 2    Resistor 32 | R |
|   lead 4    Resistor 50 | R |
|   lead 6    Resistor 41 | R/2 |
|   lead 8    Resistor 42 | R/2 |
| Resistors between the first adding junction and the input resistor 43 of the first inverter 14: | |
|   Variable Resistor 34 | R/10 |
|   Variable Resistor 36 | R/2 |
|   Resistor 37 | R |
| Resistors in first inverter 14: | |
|   Resistor 43 | R |
|   Resistor 45 | R |
| Resistors in leads converging at the second adding junction 17: | |
|   lead 24    Resistor 39 | R |
|   lead 18    Resistor 47 | 3R |
|   lead 20    Resistor 46 | 3R |
|   lead 22    Resistor 51 | 6R |
|   lead 16    Resistor 19 | 6R |
| Variable resistor between the second adding junction 17 and the third integrator 12: | |
|   Variable Resistor 40 | R/4 |
| Resistors in second inverter 11: | |
|   Resistor 48 | R |
|   Resistor 49 | R |

By way of example, R may be one megohm.

It is apparent from Fig. 2 that the first integrator 9 performs concurrent integrations of the voltages applied simultaneously through the incoming leads 2, 4, 6, 8 at the first adding junction 1. Since the input of the first integrator 9 is kept at effectively zero voltage by the high negative gain amplifier, the output, or potential difference across condenser 54, is the sum of integrals of the input voltages applied at the converging leads 2, 4, 6, 8 over a time $\tau$, the interval since the last input pulse or step arrived. Since the voltages applied at the input leads 2, 4, 6, 8 are integrated by a condenser 54 which sums currents, changing the values of the resistors 32, 50, 41, 42 will vary the input to the integrator as if the voltages applied by the leads were changed. Since current varies inversely with resistance therefore, in terms of the integrator output, the fact that resistor 41 in lead 6 is of one-half the magnitude of resistor 50 in lead 4, means the integrator is summing the integral of twice the voltage applied by lead 6 over time $\tau$, but only the actual voltage applied through lead 4 over time $\tau$. In this manner, changing the value of the resistors in the input leads results in effectively multiplying or dividing the voltage input to the integrator.

As mentioned above, the input to the first integrator 9 is $(-A+3B-3C+D)$. This is equal to $\Delta^3 f(a)$ in terms of the magnitudes of the four pulses shown in Fig. 1. The voltages applied by leads 2, 4, 6, 8, converging on the first adding junction 1, make up the input to the first integrator 9.

Lead 2 provides $+D$, the most recent input pulse at time $(A+3T)$. Since the resistance 32 in lead 2 is of relative magnitude one R, $+D$ is the effective voltage applied by input lead 2.

Lead 4 provides $-B$, the inverted output of the third sampler 26 which is the value of the output at the time $(a+T)$. Since the resistance 50 in lead 4 is of relative magnitude one R, $-B$ is the effective input voltage applied. This is apparent since the third sample 26 tripped when the input made the most recent step or at time $(a+3T)$. Since the output passes through the leading edge of the datum steps and is delayed 2T, the sampler holds the value of the output at a time 2T in the past or the value B of the input at time $(a+T)$.

Lead 6 provides in effect two times the voltage held by the second sampler 28 since the input resistor 41 is of relative magnitude one-half R. The second sampler 28 holds a voltage which is equal to minus the output of the second integrator 10 at time $(a+3T)$ which is equal to $(A/2-C/2)$ in terms of the data step magnitudes shown in Fig. 1. This can be shown by considering for simplicity that the values of the datum steps during the time period a shown in Fig. 1 are equal to zero. This makes the first datum step A shown in Fig. 1, the first datum step of any magnitude. Therefore at time $a$ in Fig. 1 datum step A is applied to the first integrator 9 in Fig. 2. By hypothesis all the preceeding datum steps are zero magnitude so the voltage sampled by sampler 28 at time $a$ is zero. At time $(a+T)$ the third order difference between two zero input pulses and data steps A and B, namely $(B-3A)$, is applied as the input to the first integrator 9. The ramp output of the first integrator 9, caused by the input A at time $a$ [which, by the time $(a+T)$ has reached a magnitude of $-A$] is simultaneously being subjected to a second integration by the second integrator 10. The value of the second integral of the ramp output of the first integrator 9 at time $(a+T)$ is $$+\frac{AT^2}{(RC)^2 2!}$$

Since the time constant (RC) of all the integrators is equal to T, the second integrator output at time $(a+T)$ equals $+A/2$. At time $(a+2T)$, datum pulse C arrives and the input to the first integrator 9 is $(C-3B+3A)$, or the third order difference of one zero datum pulse and data pulses A, B and C. During the interval $(a+T)$ to $(A+2T)$ the input to the second integrator 10 consists of two elements; one the magnitude of the voltage position of the first integrator 9 at time $a+T$, or $-A$ and; two, the negative ramp output of the first integrator caused by its input at $a+T-[B-3A]$. This can be considered an integration of a constant $[-A]$ and a ramp $-[B-3A]\tau$. The output of the second integrator 10 at time $a+2T$ therefore is equal to the sum of three components; one, its own initial position at $(a+T)$ or $+A/2$; two, the first integral of the constant $-A$, which is $+A$ and; three, the first integral of the ramp $$-[B-3A]\tau$$

which is $+(B/2-3/2A)$. The sum of these three components in the output at time $(a+2T)$ therefore is $+B/2$, the A's cancelling out.

At time $(a+3T)$ the input to the first integrator 9 is as mentioned before $(-A+3B-3C+D)$ which equals the third order difference of data pulses A, B, C, and D. During the interval $(a+2T)$ and $(a+3T)$ the input to the second integrator 10 consists again of two elements; one, the magnitude of the initial voltage position of the first integrator 9 at time $(a+2T)$ which is $$-[A+(B-3A)]$$

and; two, the negative ramp output of the first integrator caused by its input at $a+2T$, $C-3B+3A$. This can again be considered an integration of a constant $$-[A+(B-3A)]$$

and a ramp $-[C-3B+3A]\tau$. $\tau$ in all cases equals the interval elapsed since the last datum step was received. The output of the second integrator 10 at time $(a+3T)$ therefore equals the sum of three components; one, its own initial position at $a+2T$ which is $+B/2$; two, the first integral of the constant $-[A+(B-3A)]$ which is $+[A+B-3A]$ and; three, the first integral of the ramp $-[C-3B+3A]\tau$ which is $+\frac{1}{2}[C-3B+3A]$. The sum of these outputs which equals the output of the second integrator 10 at time $(a+3T)$ is shown below.

1st component _____ $+B/2$
2nd component $+[A+B-3A]$ ____ $-2A$ $+B$
3rd component $+\frac{1}{2}[C-3B+3A]$ $-+3/2A$ $-3/2B+\frac{1}{2}C$
_____
$-\frac{A}{2}$ $+\frac{C}{2}$ Therefore at time $(a+3T)$ the second integrator 10 had a voltage position equivalent to $(-A/2+C/2)$. This is inverted by inverter 14 so the second sampler 28 holds minus the output of second integrator 10 which is $A/2-C/2$. Since the resistance 41 placed in lead 6 between the first adding junction 1 and the second sampler 28 is of relative magnitude $R/2$, the effective voltage applied at the first adding junction 1 is $A-C$.

Lead 8 provides at the first adding junction 1 a voltage equivalent to $$-2A+4B-2C$$

Since the resistance 42 placed between the adding junction 1 and the 1st sampler 30 is of relative magnitude $R/2$, this is in effect two times the voltage held by the first sampler 30, at time $(A+3T)$ which is $$(-A+2B-C)$$

The output of the first integrator 9 at time $(a+3T)$ is the voltage held by the first sampler 30 at time $a+3T$. The output of the first integrator 9 is made up of two components; one, its own initial position at time $(a+2T)$ set out above as $-[A+(B-3A)]$ and the first integral of its input at time $a+2T$, $C-3B+3A$ which equals $-[C-3B+3A]$. The sum of these two components is set out below.

1st component $-[A+(B-3A)]=+2A-\ B$
2nd domponent $-[C-3B+3A]=-3A+3B-C$
_____
$-\ A+2B-C$ This analysis for simplicity again assumes data pulse A is the first pulse appearing having a magnitude other than zero. When the pulses previous to datum pulse A in Fig. 1 possess a value other than zero, the above method of analysis will still be valid since the effects of these individual pulses can be linearly superimposed. This superposition results in the interpolated output not being zero for time less than $(a+2T)$ which is as it should be for inputs not zero before time$=a$.

Adding all the voltages which feed the 1st integrator 9 we obtain the resultant constant input.

Input lead 2 _____ $+D$
Lead 4 _____ $-\ B$
Lead 6 _____ $A\ \ -C$
Lead 8 _____ $-2A+4B-2C$
_____
$-\ A+3B-3C+D$ The input to the 1st integrator 9 is thereby assembled from the input and the outputs of the three samplers 30, 28, 26. By driving the first integrator with this input ($\Delta^3 f(a)$) at time $(a+3T)$, a portion of the output generated from the interpolator at time $(a+3T+\tau)$ will contain $$\frac{\tau^3}{3!T^3}(\Delta^3 f(a))$$

This is one term in the third order difference equation the whole of which represents the output.

The fourth term of the third order difference equation is $$\frac{\tau^2}{2!T^2}(\Delta^2 f(a))$$

To generate the fourth term, $\Delta^2 f(a)$ which is a constant, is fed through a series of two integrators. These two are integrators 10 and 12 in Fig. 2. Integrator 9 at time $(a+3T)$ has an initial voltage position of $$(-A+2B-C)$$

This is equivalent to $-\Delta^2 f(a)$. This initial voltage level will cause an output of positive sign from integrator 12 equivalent to $$\frac{\tau^2}{2!T^2}(\Delta^2 f(a))$$

This is true since the inverter 14 lies between integrators 10 and 12. No additional elements need be added to the input of integrator 10, since the initial output of integrator 9 at time $(a+3T)$ was equal to $(-A+2B-C)$ as explained above. This first integrator 9 has not been reset, so its initial voltage position at time $(a+3T)$ is available for the input to integrator 10. Integrator 10 therefore performs an integration on $(-A+2B-C)$ which is a constant with reference to it, and simultaneously performs an integration on the present ramp-like output of integrator 9. It simultaneously integrates the sum of a constant, the initial position of integrator 9 at time $(a+3T)$ or $(-A+2B-C)$ and the ramp output generated by integrator 9 from its present input $\Delta^3 f(a)$. This is acceptable mathematically since $$\int_0^T x_t + y_t \, dt = \int_0^T x_t \, dt + \int_0^T y_t \, dt$$

where $x_t$ and $y_t$ are functions of time.

Five leads meet in junction 17 prior to integrator 12. The output of junction 17 is the input to integrator 12. From the third term of the third order difference equation $$\frac{\tau}{T}\left(\Delta f(a) + \frac{\Delta^2 f(a)}{2} - \frac{\Delta^3 f(a)}{6}\right)$$

it is apparent that the constant within the brackets should be the input to integrator 12 with a negative sign since the integrator inverts its output. Evaluating the bracketed expression in terms of the datum step magnitude shown in Fig. 1 we find:

$$+\Delta f(a) = B - A$$
$$+\frac{\Delta^2 f(a)}{2} = \frac{C}{2} - \frac{2B}{2} + \frac{A}{2}$$
$$-\frac{\Delta^3 f(a)}{6} = \frac{-[-A+3B-3C+D]}{6}$$

Adding these terms and multiplying by $-1$ gives:

$$+\frac{A}{3} + \frac{B}{2} - C + \frac{D}{6}$$

This then, is the constant input to integrator 12 needed to generate the third term in the difference equation. Using an analysis similar to that used above in determining the input to integrator 9, the five leads running to the junction 17 supply the following constant voltages in terms of datum step magnitudes shown in Fig. 1.

Lead $16 = D/6$
Lead $18 = A/6 - C/6$
Lead $20 = -C/3 + 2B/3 - A/3$
Lead $22 = -B/6$
Lead $24 = A/2 - C/2$ Adding up the above terms we have $$+\frac{A}{3} + \frac{B}{2} - C + \frac{D}{6}$$

or the desired input to integrator 12 required to generate the third term in the third order difference equation.

The remaining terms in the difference equation, $$f(a) + \Delta f(a),$$

are equal graphically to B in Fig. 1. This must be a constant element in the interpolator output to complete the generation of the desired expression. B is the value of the datum step at time $(a+t)$. This is available in the interpolator output as the initial position of the third integrator 12 which has not been reset. The fact that the initial voltage position of the third integrator 12 equals $+B$ in datum step magnitudes at time $a+3T$ can be shown by the same analysis used above to show the voltage position of the second integrator 10 at time $(a+3T)$.

Therefore at time $(a+3T+\tau)$, or the present time, the interpolator output is equal to the third order difference equation shown above. When $\tau$ becomes equal to T all the samplers trip again and obtain new voltages and a new datum step is received. Now the interpolator looks at a different set of four points to generate its output. In this way only the middle portion of the cubic generated is used in the ouput. This middle portion lies between the second and third points on the time scale.

By way of further illustration a cubic interpolator having resistors of a magnitude computed with reference to the above schedule where R is made equal to one megohm and using condensers of .05 microfarad will have integrators with a time constant of .05 second. Therefore T the interval between datum steps must also be .05 second. Such an interpolator handles twenty pulses or steps per second. The samplers used in such an interpolator should be capable of receiving the signal in .001 second. For acceptable accuracy the ratio between T and the period required by the sampler to receive its sample voltage should be approximately 50:1. Interpolators have been realized which handle above 1000 steps per second. The main limitation upon the number of steps per second which can be interpolated is apparently the speed with which the samplers are able to pick off the voltage they must hold. Samplers are available which are capable of obtaining a sample of an input signal voltage in under one-half a micro-second.

It will thus be apparent that the present invention provides novel and useful apparatus for electronically interpolating between discrete pulses or steps so as to generate a smoothed, continuous output signal that accurately corresponds to the mathematically derivable curve based on the input information. The precision of the curve is naturally dependent on the number of integrations, but in general it will be found that the cubic interpolator described will be found practical and suitable for most operations. The actuation of the samplers at the initiation of the input pulses enables the interpolator output to correspond to the heights of the steps or pulses at the leading edges thereof, with the stored samples being subjected to further integrations to control the shape of the curve between steps. It will be appreciated that the invention comprehends the provision of interpolators of other orders than cubic, as may be needed to afford the desired approximations between datum steps.

Having thus described the invention, we claim:

1. An electronic interpolator for generating a smoothed output signal from a stepped input signal having pulses of equal duration, comprising a plurality of serially connected electronic integrators connected to a signal input and having capacitive feedback, said integrators having time constants substantially equal to the duration of the input pulses, a plurality of voltage samplers each connected to the output of an integrator, said samplers having means for storing voltages corresponding to voltage outputs from the integrators on the initiation of each input pulse, each integrator having a sampler associated therewith, inverting means associated with the second integrator and intermediate said integrator and its sampler, and second inverting means associated with the third integrator and sampler and connected to the output of said third sampler, and means connected to the signal input for applying to the input of the first integrator voltages from the first and second samplers and from the inverting means in the output of the third sampler in summing relation to the stepped signal input.

2. An electronic interpolator for generating a smoothed output signal from a stepped input signal having pulses of equal duration, comprising first, second and third serially connected electronic integrators, said integrators having time constants substantially equal to the duration of the input pulses, first and third voltage samplers each having its input connected to the output of the correspondingly-numbered integrator, first inverting means connected between the second and third integrators, a second voltage sampler having its input connected to the output of said inverting means, said samplers having means for storing voltages corresponding to voltage outputs from the integrators on the initiation of each input pulse, a first adding junction connected between the first integrator and a signal input, a second adding junction connected between the first inverting means and third integrator, and second inverting means having its input connected to the output of the third sampler and its output to each of said junctions, each of said first and second samplers also having its output connected to each of said junctions and said signal input being connected to said second junction independently of the serial connection of integrators.

3. Apparatus for providing a continuous electrical signal from a plurality of electrical pulses which are equally spaced in time, the height of said pulses representing sampled values of said continuous function, comprising, in combination, a plurality of serially connected integrators, said integrators having substantially identical time constants, and said time constants being substantially equal to the period of said pulses, means for sampling the output of selected integrators, said sampling means including means for holding a selected sample for a time equivalent to at least the period of said pulses, and means for combining selected proportions of selected sampled signals at the input terminals of selected integrators.

4. The combination defined in claim 3 in which the time during which said selected integrator outputs are being sampled is not more than 1/50 of the period of said pulses.

5. The combination defined in claim 3 in which said sampling means are actuated by the leading edge of pulses from which said continuous signal is formed.

6. Apparatus for providing a continuous electrical signal from a plurality of electrical pulses, the height of said pulses representing sampled values of said continuous function comprising, in combination a plurality of serially connected integrators, said integrators including a high negative gain amplifier, a resistor connected in series with said amplifier, a condenser connected between the input and output terminals of said amplifier, the value of said condenser and resistor being selected so that $$\frac{1}{RC}$$

is equal to the period of said pulses, R being the value of said resistor and C being the value of said condenser, means for sampling the output of selected integrators, said sampling means including means for holding a selected sample for a time equivalent to at least the period of said pulses, and means for combining selected proportions of selected sampled signals at the input terminals of selected integrators.

7. Apparatus for providing a continuous electrical signal from a plurality of electrical pulses which are equally spaced in time, the height of said pulses representing sampled values of said continuous function, comprising, in combination, a plurality of serially connected integrators, said integrators having substantially identical time constants, and said time constants being substantially equal to the period of said pulses, means for sampling the output of selected integrators, said sampling means including an electronic switch, said switch being operated by the leading edge of said pulses, means connecting the output of said integrators to the input terminal of said switch, a condenser, one terminal of said condenser being connected to the output terminal of said switch, and the other terminal of said condenser being connected to a reference potential in common with the output of said integrator, and an output stage having a high input impedance and a low output impedance, the input terminal of said output stage being connected to the output terminal of said switch, said condenser being adapted to hold the voltage applied thereto when said switch is closed for a time equivalent to at least the period of said pulses, and means for combining selected sampled signals at the input terminals of selected integrators.

8. The combination defined in claim 7 in which the gain of said sampling circuit is substantially unity.

9. The combination defined in claim 7 in which said output stage is a cathode follower circuit.

10. Apparatus for providing a continuous electrical signal from a plurality of electrical pulses, the height of said pulses representing sampled values of said continuous function comprising, in combination a plurality of serially connected integrators, said integrators including a high negative gain amplifier, a resistor connected in series with said amplifier, a condenser connected between the input and output terminals of said amplifier, the value of said condenser and resistor being selected so that $$\frac{1}{RC}$$

is equal to the period of said pulses, R being the value of said resistor and C being the value of said condenser, means for sampling the output of selected integrators, said sampling means including an electronic switch, said switch being operated by the leading edge of said pulses, means connecting the output of said integrators to the input terminal of said switch, a condenser, one terminal of said condenser being connected to the output terminal of said switch, and the other terminal of said condenser being connected to a reference potential in common with the output of said integrator, and an output stage having a high input impedance and a low output impedance, the input terminal of said output stage being connected to the output terminal of said switch, said condenser being adapted to hold the voltage applied thereto when said switch is closed for a time equivalent to at least the period of said pulses, and means for combining selected sampled signals at the input terminals of selected integrators.

References Cited in the file of this patent

UNITED STATES PATENTS

| | | |
|---|---|---|
| 1,315,539 | Carson | Sept. 9, 1919 |
| 2,467,486 | Krumhansl et al. | Apr. 19, 1949 |
| 2,584,882 | Johnson | Feb. 5, 1952 |
| 2,621,292 | White | Dec. 9, 1952 |
| 2,662,113 | Schouten et al. | Dec. 8, 1953 |
| 2,697,168 | Spaulding | Dec. 14, 1954 |
| 2,710,348 | Baum et al. | June 7, 1955 |
| 2,735,007 | McCurdy | Feb. 14, 1956 |
| 2,757,283 | Ingerson et al. | July 31, 1956 |
| 2,759,998 | Labin et al. | Aug. 21, 1956 |